United States Patent [19]

DuBois

[11] Patent Number: 4,889,900

[45] Date of Patent: Dec. 26, 1989

[54] PREPARATION OF ALKYL METHACRYLATE MONOMERS FOR ANIONIC POLYMERIZATION

[75] Inventor: Donn A. DuBois, Houston, Tex.

[73] Assignee: Shell Oil Company, Houston, Tex.

[21] Appl. No.: 364,955

[22] Filed: Jun. 12, 1989

[51] Int. Cl.$^4$ .................. C08F 4/46; C08F 18/12; C08F 18/02

[52] U.S. Cl. .................. 526/77; 526/173; 526/177; 526/178; 526/180; 526/312; 526/320; 526/327; 526/329.7; 526/328

[58] Field of Search .................. 526/77, 173, 177, 178, 526/180, 312, 320, 327, 329.7, 328, 912

[56] References Cited

U.S. PATENT DOCUMENTS 4,388,448  6/1983  Melby .................. 525/327.3
4,417,034  11/1983  Webster .................. 526/190

OTHER PUBLICATIONS

Long et al., Anionic Synthesis and Characterization of Various Poly(Alkyl Methacrylates), Polymer Preparation, 27(2), 258 (1986).
Long et al., Synthesis and Characterization of Ion-Containing Block Copolymers by Anionic Techniques, Polymer Preprints 28(1), 384 (1987).
Allen et al., Synthesis of Tactic Poly(Alkyl Methacrylate) Homo and Copolymers, Advances in Polymer Synthesis, 347 (1985).
Allen et al., Studies on the Synthesis of Novel Block Ionomers, ACS Symposium Series, 302, 79 (1986).
Anderson, "Speed" Marvel at DuPont, J. Macromol. Sci.-Chem., A21, 1665-1687, (1984).
T. E. Long, PhD Dissertation, Virginia Polytechnic Institute and State University, (1987).

Primary Examiner—Joseph L. Schofer
Assistant Examiner—F. M. Teskin
Attorney, Agent, or Firm—Del S. Christensen

[57] ABSTRACT

A process is disclosed for treatment of alkyl methacrylate monomers for subsequent polymerization by an anionic initiator to produce a polymer with a molecular weight distribution between about 1.20 and about 1.01. The process involves treatment of the monomer with an aluminum hydrocarbyl or boron hydrocarbyl in quantities which permit polymerization in the presence of the by-products of the reaction between the impurities and the aluminum hydrocarbyl or boron hydrocarbyl.

15 Claims, No Drawings

PREPARATION OF ALKYL METHACRYLATE MONOMERS FOR ANIONIC POLYMERIZATION

BACKGROUND OF THE INVENTION

This invention relates to a process for purifying alkyl methacrylates. In one aspect, the invention relates to the anionic polymerization of alkyl methacrylate monomers.

Alkyl methacrylates may be polymerized by either anionic or free radical mechanisms. A problem with free radical polymerization is termination of the polymerization by disproportionation or by combination reactions. These untimely terminations of the polymer growth cause free radically polymerized polymers to have broad molecular weight distributions. These termination mechanisms and other limitations associated with free radical polymerization also prevent preparation of well defined block copolymers and star shaped polymers by free radical polymerization.

Preparation of alkyl methacrylate polymers, random copolymers and block copolymers by anionic polymerization is described in U.S. Pat. No. 4,388,448. Anionic polymerization of alkyl methacrylates affords a synthetic route to block copolymers by sequential addition of monomers. By anionic polymerization, macromolecules can be prepared with predictable molecular weights, controlled stereochemistry and narrow molecular weight distributions.

Anionic polymerization of alkyl methacrylates has not been commercially significant, however, because of two major problems. First, anionic polymerization initiators are inherently reactive with the alkyl methacrylate carbonyl group. This problem has been addressed by the use of bulky initiators, by polymerization at low temperature and by the use of polar solvents.

The second major problem with anionic polymerization of alkyl methacrylates is the inherent presence of chain-terminating protonic contaminates in alkyl methacrylate monomers. Synthesis of alkyl methacrylate monomers involves either esterification or transesterification with the starting alcohol which ultimately defines the ester alkyl. These alcohols may form azeotropes with the alkyl methacrylates and are therefore expensive and difficult to separate from the alkyl methacrylates by distillation. Longer ester alkyl methacrylate monomers are particularly difficult to separate from alcohols because higher distillation temperatures can cause thermal polymerization.

As a consequence of the problems discussed above, most current commercial poly(alkyl methacrylates) are produced utilizing free radical initiators. Free radical polymerization is not sensitive to the presence of the trace amounts of alcohol, but does not realize the advantages of anionic polymerization.

A process to purify alkyl methacrylate monomers has been described by McGrath in R. D. Allen, T. E. Long, S. E. McGrath, Advances in Polymer Synthesis, 347–61 (1985), in which monomer was stirred over a drying agent and then subjected to vacuum distillation. Alcohols and remaining protonic contaminates were then titrated with a trialkyl aluminum until a persistent yellow-green complex was formed, and the monomer was then vacuum distilled from the impurities. The yellow-green end point indicates the presence of metal complexes with carbonyls. The trialkylaluminums may react with one, two or three alcohol groups, but will not be available to form complexes while alcohol groups are free due to the great affinity of the metal alkyl for the alcohol group.

A problem inherent with such a use of aluminum alkyls to purify alkyl methacrylates is the possibility that trace oxygen, especially with the presence of UV light, may produce aluminum peroxides, which act as free radical polymerization initiators for alkyl methacrylates. This problem is magnified by the need to distill the monomer from the impurities, and the excess of trialkyl aluminum used.

Purification of higher alkyl methacrylates is particularly troublesome using McGrath's method. Exposure of the monomers to higher temperatures increases the opportunity for initiation of a highly exothermic free radical polymerization. The higher boiling temperatures of longer chain alkyl methacrylates such as 2-ethylhexyl methacrylate and lauryl methacrylate therefore precludes the use of distillation to purify the monomers in the presence of trialkyl aluminums even under reduced pressures.

T. E. Long has suggested the possibility of conducting the polymerizations of alkyl methacrylates in the presence of the resultant aluminum compounds. T. E. Long, PhD Dissertation, Virginia Polytechnic Institute and State University, 211 (October, 1987). This suggestion is not commercially acceptable due to the complexed trialkylaluminum present which is indicated by the yellow-green color present after addition of trialkyl aluminums according to Long's process.

Long also discloses a second monomer purification technique which avoids the need to distill the monomer from the purification by-products. This method incorporates treating dried monomer with triethyl aluminum, then passing the mixture over a column of alumina which has been prewetted with dry tetrahydrofuran. The alumina absorbs the excess trialkylaluminum and reaction products of alcohol and water and triethyl aluminum. The monomer is then degassed several times. Although this method avoids the need to distill the dried monomer, care must be taken to avoid exotherms as the monomer is passed over the alumina. The column purified monomer anionically polymerized to a homopolymer with a molecular weight distribution (Mw/Mn) as determined by gel permeation chromatography (GPC) of 1.59. This was an improvement over Long's control example, where polymers were produced from alkyl methacrylates which were purified only by drying with calcium hydrides (2.04) but still falls short of Long's polymers produced from distillation purified monomers (1.35), and remains unsatisfactory for commercial use. An improved process for purifying alkyl methacrylate monomers is therefore still required.

It is therefore an object of the present invention to provide a process to purify alkyl methacrylate monomers for subsequent anionic polymerization which does not require distillation of the monomer in the presence of potential free radical polymerization initiators. It is a further object of the present invention to provide a process to purify alkyl methacrylate monomers to a purified monomer capable of being anionically polymerized to a polymer with a narrow molecular weight distribution.

SUMMARY OF THE INVENTION

According to the invention, a process for preparing poly(alkyl methacrylate) is provided, the process comprising contacting the monomer with an alcohol-scavenging compound, and then anionically polymerizing the purified monomer in the presence of any remaining alcohol scavenging compound and by-products of the alcohol-scavenging reaction. The alcohol-scavenging compound is selected from the group consisting of aluminum hydrocarbyls, boron hydrocarbyls, aluminum hydrides, boron hydrides and mixtures thereof.

The process of the present invention permits the preparation of alkyl methacrylate polymers with narrow molecular weight distributions and is particularly advantageous when alkyl methacrylate monomers having alkyl groups containing four or more carbon atoms are to be anionically polymerized. This particular advantage is due to the absence of the need to separate the alcohol-scavenging compound from the monomer prior to polymerization.

DETAILED DESCRIPTION OF THE INVENTION

Alkyl Methacrylates

Alkyl methacrylate monomers useful for the practice of this invention include those capable of anionic polymerization and having the formula $CH_2=C(CH_3)CO_2R$, wherein R can be, for example:

(a) alkyl of 1 to 18 carbon atoms, branched or unbranched;

(b) alkenyl of 2 to 18 carbon atoms;

(c) alkadienyl of 5 to 18 carbon atoms;

(d) dialkylaminoalkyl of about 4 to 12 carbon atoms; or (e) alkoxyalkyl of about 3 to 12 carbon atoms.

Representative methacrylate monomers include the following:

Alkyl methacrylates such as methyl, ethyl, propyl, butyl, s-butyl, t-butyl, hexyl, octyl, 2-ethyhexyl, decyl, dodecyl, and octadecyl methacrylates; alkenyl methacrylates such as vinyl, alkyl, methallyl, undecenyl, and 9-octadecenyl methacrylates; alkadienyl methacrylates such as 2,4-pentadienyl, 2,4-hexadienyl, 2,4-octadienyl, 4,7-octadienyl, 9,12-octadecadienyl, and geranyl methacrylates; dialkylaminoalkyl methacrylates such as 2-dimethylaminoethyl, 3-dimethylaminopropyl, 6-diethylaminohexyl, 2-diethylaminoethyl, 2-dibutylaminoethyl, 2-dihexylaminoethyl, and 6-dimethylaminohexyl methacrylates; and alkoxyalkyl methacrylates such as 2-methoxyethyl, 2-ethoxyethyl, 2-butoxyethyl, and 3- and 4-methoxybutyl methacrylates.

The choice of the monomer alkyl group affects the properties of the resultant polymer, the ease of hydrolysis to form an acid functionality from the polymer ester groups and, to a large extent, affects the kinetics of polymerization. Each of the potential monomers requires removal of trace alcohols and other protonic contaminates before anionic polymerization may be successfully performed. The most preferred alkyl methacrylate is t-butyl methacrylate due to the fact that, with the monomer purification process of the present invention, it may be polymerized at temperatures as high as $+25°$ C. yet retain the desirable attributes of living anionic polymerization.

Drying

Water is a protonic contaminate which will terminate chain growth for anionic polymerization. Water must therefore be removed from water-contaminated monomer before anionic polymerization to enable narrow polymer molecular weight distributions and predictable molecular weights.

Water will react with the alcohol scavenging compound of the present invention and, with relatively small quantities of water, the drying step can therefore be eliminated at the expense of the use of more alcohol scavenging compound and increased amounts of by-products in the reaction mixture. Generally, purification of the monomer preferably includes removal of water before contacting the monomer with the alcohol scavenging compound, because water may be removed from the monomer much easier and more economically than alcohol. Prior removal of water greatly reduces the amount of alcohol-scavenging compound required and greatly reduces the amount of by-products remaining in the monomer which could interfere with polymerization.

Drying is performed by either contact of the monomer with a drying agent such as alumina, silica gel, calcium chloride, or molecular sieves, or by distillation or by a combination of distillation and contact with a drying agent. Distillation of the monomer at this stage of the process is not as undesirable as distillation after contact with the alcohol scavenging agent due to the absence of potential free radical initiators before contact with the alcohol scavenger. Following the drying step, the monomer preferably contains no more than about 0.03 weight percent water. Most preferably, the dried monomer contains less than 0.02 percent weight water.

Alcohol Scavenging Compound

Compounds useful as alcohol-scavenging compounds in the practice of this invention include aluminum hydrocarbyls, boron hydrocarbyls, aluminum hydrides, boron hydrides and mixtures thereof. The amount of alcohol scavenging compound is within the range of about 0.1 mole percent and about 1.4 mole percent, based on monomer. Lesser amounts are not sufficient to scavenge alcohols present in commercial grade alkyl methacrylate monomers and greater amounts result in levels of alcohol-scavenging products and excess alcohol scavenger which interfere with anionic polymerization.

An effective amount of alcohol-scavenging compound is from about ⅓ to about slightly over 1 mole of alcohol-scavenging compound per mole of protonic impurities in the monomer solution. Preferably from about ½ and about 1 mole of alcohol-scavenging compound per mole of protonic impurities. At least one mole of the alcohol-scavenging compound per three moles of protonic impurities is required to result in sufficient reaction with the protonic impurities present in the monomer solution. Although a slight excess of alcohol-scavenging agent to protonic impurities does not prevent anionic polymerization of alkyl methacrylate to a narrow molecular weight distribution polymer, sufficient excess to permit visual detection of the color of the complex formed between the alcohol scavenging agent and the alkyl methacrylate prevents subsequent polymerization of the alkyl methacrylate to a narrow molecular weight range polymer unless the excess was removed from the monomer solution.

Persons skilled in the art will recognize that each species of alcohol-scavenging compound will have a varying optimum dosage and will have a varying range of effective dosages. The upper limit of effectiveness will depend upon the effectiveness of the scavenging compound and the reaction products of the scavenging compound and alcohols as initiators and/or terminators of anionic polymerization. Boron compounds are somewhat less active than aluminum compounds as initiators for undesirable free radical polymerization of alkyl methacrylates and, therefore, may be used in higher dosages without resulting in a polymerized product with unacceptably wide distribution of polymer molecular weights. Higher dosages of boron compounds are also beneficial due to the kinetics of their alcoholysis reaction being generally slower than those of aluminum alkyl compounds.

Hydrocarbyl radicals of the aluminum or boron hydrocarbyls acceptable for the practice of the present invention may be selected from a wide variety of hydrocarbyl groups. The hydrocarbyl may be an alkyl group, a cycloalkyl group, an alkene group or an aromatic group. Any molecular weight group may be used, but preferably the hydrocarbyl group contains from one to 20 carbon atoms. Examples of suitable alkyls include methyl, ethyl, propyl, secondary butyl, tertiary butyl, pentyl, and hexyl. Also acceptable are cycloalkyls containing saturated rings of 5–7 carbon atoms such as cyclopentane, cyclohexane and substituted cyclohexane. Alkene groups of vinyl, allyl, butenyl and pentenyl are acceptable, as are dienyls such as butadienyl and pentadienyl. Mono-unsaturated cyclic hydrocarbon radicals and di-unsaturated cyclic hydrocarbon radicals containing rings with 5–7 carbon atoms are acceptable for the practice of this invention. An example is cyclopentadienyl. Aromatic radicals, substituted aromatics and radicals containing one or more aromatic rings such as naphthyl, tolyl, benzyl and dimethylnaphthyl are acceptable as the hydrocarbyl for the practice of this invention. Because of commercial availability, preferred scavenging agents are aluminum or boron trialkyls wherein the alkyl groups are $C_{1-4}$ alkyls. Most preferable are triethyl aluminum and triethyl boron.

The aluminum or boron hydrocarbyl may be contacted with the alkyl methacrylate in a non-protonic solvent, like tetrahydrofuran, ether, hexane, cyclohexane or benzene. The aluminum or boron hydrocarbyl may also be contacted with the alkyl methacrylate in a solution of essentially the monomer and the aluminum or boron hydrocarbyl.

The time for reaction of the alcohol scavenging compounds with protonic impurities in alkyl methacrylate monomers can vary depending on the reactants and conditions. Contact times as low as 10 seconds could be acceptable, with agitation to aid in the contact and mixing between the alcohol-scavenging compound and any protonic impurities. Preferred contact times are from about one minute to about two hours and most preferred are from two minutes to one hour. The contact time required would be expected to be inversely related to both the absolute temperature and the amount of agitation provided.

Anionic Polymerization of the Treated Monomer

Anionic polymerization of the treated monomer in the practice of this invention can be carried out as known in the art for anionic polymerization of alkyl methacrylates.

Initiators for anionic polymerization of alkyl methacrylates include an organic anion and a counterion of any alkali metal. Lithium is the preferred alkali metal cation.

Representative useful organo(alkali metal) compounds include the following:

1,1-Diphenylhexyl(alkali metals);

adducts of any alkyl(alkali metal), n-, sec-, or tert-, with any 1,1-diaryl-substituted ethylene provided the aryl substituents are free of electrophilic substituents,

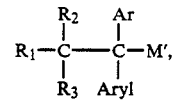

wherein:
$R_1$ = alkyl,
$R_2$ = H or alkyl,
$R_3$ = H or alkyl,
Ar is aryl,
M' = alkali metal;
Diisopropylamido(alkali metals);

an adduct of any secondary or tertiary alkyl(alkali metal)($R_1M'$) with any pyridine unsubstituted in the 2, 5, and 6 positions, i.e.,

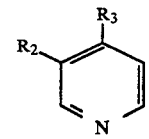

to give the adduct

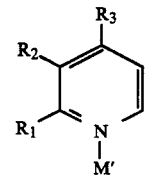

wherein $R_2$ and $R_3$ are non-electrophilic;

cumyl and cumyl-type alkali metal derivatives where substituent limitations are as described above:

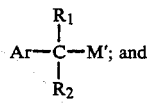

polynuclear hydrocarbon-alkali metal adducts such as naphthalenesodium and biphenylsodium.

Of the foregoing compounds, the diphenylhexyl, cumyl, and diisopropylamido compounds are preferred. The diphenylhexyl compounds can be generated in situ by addition of an organo (alkali metal) compound to 1,1-diphenylethylene.

Anionic polymerization of alkyl methacrylates is best carried out in polar solvents that form separated ion-pairs. Breaking down the lithium aggregates imparts a faster initiation rate in addition to retarding intramolecular termination (cyclization). However, pseudo-living conditions may be obtained in non-polar solvents like toluene or hexanes.

Tetrahydrofuran (THF) is the preferred solvent. Other ether-type solvents such as 1,2-dimethoxyethane (DME or glyme), diethylene glycol dimethyl ether (diglyme) or mixtures of these with aromatic or saturated hydrocarbons are useful solvents.

The polymerization medium has a direct effect on the polymer tacticity, and hence its glass transition temperature. Non-polar solvents generally result in highly isotactic polymers whereas those produced in polar media are predominantly syndiotactic. This effect is most pronounced for the smaller alkyl esters. For example, poly(methyl)methacrylate may have a difference in Tg of 80° C. between syndiotactic and isotactic microstructures, whereas, poly(tertiary-butyl)methacrylate (PTBMA) has a corresponding Tg differential of only 20° C.

A typical total monomer charge is one mole in one liter of solvent (1M) and initiator concentrations are typically between about 0.1M and 0.0015M. At this molarity, the solutions are about 10 to 15% solids when polymerization is complete. Lower concentrations (5 to 10%) are acceptable. Higher concentrations (above 15%) cause increased viscosity which may interfere with proper mixing during the latter stages of monomer addition. Incomplete mixing may lead to an undesirable broadening in molecular weight distribution. The rate of monomer addition should be maintained so as to keep the reaction temperature within an acceptable temperature range.

The temperature required for polymerization of alkyl methacrylates to polymers having narrow molecular weight distributions varies with the particular alkyl methacrylate monomer being polymerized. With monomers treated according to this invention, it has been observed that tertiary butyl methacrylate can be polymerized at as high as about 25° C. Isobutyl methacrylate may be polymerized at a temperature as high as about 0° C. Polymerization of methyl methacrylate must be performed below about −40° C. to result in a polymer having narrow molecular weight distribution. It is important that the temperature of the polymerization be at or below the particular required temperature.

The polymerization can be terminated with a protic material such as water, methanol or acetic acid, and the polymer can be isolated by stripping off the solvent. Alternatively, the polymer can be precipitated in an appropriate nonsolvent such as water or alcohol.

Poly(alkyl methacrylates) produced by the process of this invention have molecular weight distribution (Mw/Mn) of between about 1.20 and about 1.01 and preferably between about 1.01 and about 1.10.

EXAMPLES

In Examples 1 through 14, tertiary butyl methacrylate was purified by the process of the present invention and subsequently polymerized at 25° C. using diphenylhexyl lithium as an initiator. Example 15 is a comparison example, with no alcohol scavenger used. Triethyl aluminum was utilized as the alcohol scavenger in amounts of 1.4, 1.3, 1.0, 0.8, 0.5, 0.2 and 0.1 mole % based on the moles of the monomer for Examples 1, 3, 5, 7, 9, 11 and 13, respectively. Triethyl boron was utilized as the alcohol scavenger at levels of 1.4, 1.3, 1.0, 0.8, 0.5, 0.2, and 0.1 mole % based on the moles of the monomer of Examples 2, 4, 6, 8, 10, 12 and 14, respectively.

Table 1 is a summary of Examples 1–15 alcohol scavenger type, amount, molecular weight distribution of polymer, theoretical molecular weight (grams monomer/moles initiator) and molecular weight as measured by GPC with polystyrene standards.

Tertiary butyl methacrylate (TBMA) was dried by stirring over calcium hydride for approximately twelve hours, then vacuum distilled. After the drying, the monomer contained 0.1 to 0.3 mole percent alcoholic impurities as determined by gas chromatography.

The dried TBMA was then combined with the alcohol scavenging agent and stirred for approximately 30 minutes at approximately room temperature. Both triethyl aluminum and triethyl boron were purchased and used as a 1.0 molar solution in tetrahydrofuran (THF).

For each Example 1–15, a purged polymerization bottle equipped with a stir bar and a heavy duty rubber septum was charged with about 210 ml of anhydrous THF and a two-fold excess of 1,1-diphenylethylene (DPE) based on moles S-BuLi. After equilibration to a temperature of about 25° C. the THF/DPE solution was titrated to remove protic impurities by adding s-BuLi until a faint, persistent pink color of dipenylhexyllithium was observed. Additional THF was added dropwise until the pink color disappeared. At this point the charge of s-BuLi necessary to polymerize the monomer to a targeted molecular weight was added. This resulted in a dark red solution of diphenylhexyllithium. The methacrylate monomer, treated with ether TEA, TEB or untreated was added dropwise into the reactor via a double ended needle. The red color disappeared upon addition of the first drops of monomer which is indicative of the colorless polyenolate. The polymerization was allowed to proceed for 20 minutes before termination with MeOH. The polymers were stabilized with Irganox 1010 antioxidant, isolated by precipitation in MeOH, and dried to a constant weight in a vacuum oven.

TABLE 1

| Example No. | $MR_3$ | $(MR_3)$ Mole % | Mw/Mn | Mn(theor) | Mn(GPC) |
|---|---|---|---|---|---|
| 1 | TEA | 1.4 | 1.73 | 25.10 M | 34.11 M |
| 2 | TEB | 1.4 | 1.28 | 24.90 M | 26.71 M |
| 3 | TEA | 1.3 | 1.71 | 25.92 M | 33.08 M |
| 4 | TEB | 1.3 | 1.20 | 27.93 M | 28.33 M |
| 5 | TEA | 1.0 | 1.36 | 24.20 M | 23.57 M |
| 6 | TEB | 1.0 | 1.16 | 21.96 M | 22.62 M |
| 7 | TEA | 0.8 | 1.28 | 22.85 M | 25.30 M |
| 8 | TEB | 0 8 | 1.08 | 26.86 M | 26.80 M |
| 9 | TEA | 0.5 | 1.26 | 25.05 M | 25.82 M |
| 10 | TEB | 0.5 | 1.16 | 23.85 M | 24.41 M |
| 11 | TEA | 0.2 | 1.06 | 36.12 M | 37.57 M |
| 12 | TEB | 0.2 | 1.14 | 25.80 M | 26.02 M |
| 13 | TEA | 0.1 | 1.10 | 25.80 M | 25.97 M |
| 14 | TEB | 0.1 | 1.43 | 31.00 M | 34.60 M |
| 15 | — | 0 | 2.00 | 24.65 M | 19.77 M |

Example 16 was an attempt to purify tertiary butyl methacrylate using the prior art process of titrating the monomer with triethyl aluminum until a yellow-green endpoint is reached, then vacuum distillation of the monomer from the reaction products of the triethyl aluminum and alcohol and the excess triethyl aluminum.

In Example 16, tertiary butyl methacrylate monomer was stirred over $CaH_2$ under a nitrogen pressure for over 24 hours. The monomer was then vacuum distilled from the $CaH_2$, yielding 22.5 ml of dry monomer. Triethyl aluminum was added until the solution was a yellow-green color. The monomer polymerized within 30 minutes of the addition of the triethyl aluminum by free radical polymerization, forming a useless gel and preventing anionic polymerization.

I claim:

1. A process for preparing polymer of a methacrylate monomer comprising:
    (a) providing a starting material comprising a methacrylate monomer capable of anionic polymerization and an alcohol;

(b) contacting said starting material with about 0.1 to about 1.4 mole percent, based on moles of the methacrylate monomer, of an alcohol-scavenging agent selected from the group consisting of aluminum hydrocarbyl, boron hydrocarbyl, aluminum hydride, boron hydride, and mixtures thereof, under conditions effective for reaction of the alcohol-scavenging agent and at least a portion of the alcohol to produce a mixture comprising the methacrylate monomer and reaction by-products; and (c) contacting said mixture with an anionic polymerization initiator unit anionic polymerization conditions to produce the said polymer having a molecular weight distribution between about 1.20 and about 1.01.

2. The process of claim 1 wherein the alcohol scavenging agent is aluminum alkyl present in an amount within the range of about 0.1 to about 0.8 mole percent, based on moles of the methacrylate monomer.

3. The process of claim 2 wherein the aluminum alkyl is present in an amount within the range of from about 0.1 to about 0.5 mole percent, based on the moles of the methacrylate monomer.

4. The process of claim 1 wherein the alcohol scavenging compound is an alkyl borane.

5. The process of claim 4 wherein the amount of alcohol scavenging agent is from about 0.5 to about 1.2 mole percent based on monomer.

6. The process of claim 5 wherein the amount of alcohol scavenging agent is from 0.7 to about 0.9 mole percent based on moles of monomer present.

7. The process of claim 1 wherein the methacrylate monomer is an alkyl methacrylate selected from the group consisting of isobutyl methacrylate and tertiary butyl methacrylate.

8. The process of claim 1 wherein the alcohol scavenging agent is triethyl borane.

9. The process of claim 1 wherein the alcohol scavenging agent is triethyl aluminum.

10. The process of claim 1 wherein the monomer methacrylate an alkyl is methacrylate selected from the group consisting of branched or unbranched $C_{1-18}$ alkyl methacrylates.

11. The process of claim 1 wherein the methacrylate monomer is an alkenyl methacrylate selected from the group consisting of $C_{2-18}$ alkenyl methacrylates.

12. The process of claim 1 wherein the methacrylate monomer is an alkadienyl methacrylate selected from the group consisting of $C_{5-18}$ alkadienyl methacrylates.

13. The process of claim 1 wherein the methacrylate monomer is a dialkylaminoalkyl methacrylate selected from the group consisting of $C_{4-12}$ dialkylaminoalkyl methacrylates.

14. The process of claim 1 wherein the methacrylate monomer is an alkoxyalkyl methacrylate selected from the group consisting o $C_{3-12}$ alkoxyalkyl methacrylates.

15. The process of claim 1 wherein the polymer produced has a molecular weight distribution within the range of about 1.01 to about 1.10.

* * * * *

UNITED STATES PATENT AND TRADEMARK OFFICE
CERTIFICATE OF CORRECTION

PATENT NO. : 4,889,900

DATED : December 26, 1989

INVENTOR(S) : Donn A. DuBois

It is certified that error appears in the above-identified patent and that said Letters Patent is hereby corrected as shown below:

Column 9, line 12, delete "unit" and insert --under--.

Signed and Sealed this

Fourth Day of December, 1990

*Attest:*

HARRY F. MANBECK, JR.

*Attesting Officer*    *Commissioner of Patents and Trademarks*